(12) United States Patent
Stephenson

(10) Patent No.: US 11,052,468 B2
(45) Date of Patent: Jul. 6, 2021

(54) SURFACE ROUGHENING TOOL WITH TRANSLATABLE SWAGING BLADES

(71) Applicant: Ford Motor Company, Dearborn, MI (US)

(72) Inventor: David Alan Stephenson, Detroit, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 16/486,537

(22) PCT Filed: Feb. 21, 2017

(86) PCT No.: PCT/US2017/018643
§ 371 (c)(1),
(2) Date: Aug. 16, 2019

(87) PCT Pub. No.: WO2018/156097
PCT Pub. Date: Aug. 30, 2018

(65) Prior Publication Data
US 2020/0001380 A1    Jan. 2, 2020

(51) Int. Cl.
*B23B 41/12* (2006.01)
*B23C 3/34* (2006.01)
(Continued)

(52) U.S. Cl.
CPC ............... *B23B 41/12* (2013.01); *B23C 3/34* (2013.01); *B23C 5/18* (2013.01);
(Continued)

(58) Field of Classification Search
CPC .. B23B 41/12; B23C 3/34; B23C 5/18; Y10T 408/375
See application file for complete search history.

(56) References Cited

U.S. PATENT DOCUMENTS

| 294,484 A | * | 3/1884 | Malmedie | ......... B23B 29/03446 |
| | | | | 408/161 |
| 3,405,049 A | * | 10/1968 | Czubak | ................... B24B 33/08 |
| | | | | 204/217 |

(Continued)

FOREIGN PATENT DOCUMENTS

| CN | 1871090 A | 11/2006 |
| CN | 101264533 A | 9/2008 |

(Continued)

OTHER PUBLICATIONS

International Search Report for PCT/US2017/018643 dated May 23, 2017, 2 pages.

(Continued)

*Primary Examiner* — Eric A. Gates
(74) *Attorney, Agent, or Firm* — Vincent Mastrogiacomo; Brooks Kushman P.C.

(57) ABSTRACT

A surface roughening tool includes a cylindrical body and at least one grooving blade outwardly radially projecting from the body and configured to form grooves and peaks into a surface. The surface roughening tool also includes at least one swaging blade outwardly radially projecting from the body and configured to deform the peaks. The at least one swaging blade is aligned with the at least one grooving blade along a circumference of the body.

6 Claims, 6 Drawing Sheets

(51) Int. Cl.
  *B23C 5/18* (2006.01)
  *C23C 4/02* (2006.01)
(52) U.S. Cl.
  CPC ..... *B23B 2220/123* (2013.01); *B23B 2220/44* (2013.01); *B23C 2215/242* (2013.01); *B23C 2222/04* (2013.01); *B23C 2222/52* (2013.01); *C23C 4/02* (2013.01); *Y10T 407/1914* (2015.01); *Y10T 407/23* (2015.01); *Y10T 408/375* (2015.01); *Y10T 409/307616* (2015.01)

(56) References Cited

U.S. PATENT DOCUMENTS

| | | | | |
|---|---|---|---|---|
| 4,105,360 | A * | 8/1978 | Keller | B23B 29/034 408/118 |
| 4,224,846 | A * | 9/1980 | Eysel | B23B 29/03457 408/147 |
| 4,508,475 | A * | 4/1985 | Peuterbaugh | B23B 29/03446 408/153 |
| 4,615,652 | A * | 10/1986 | Van Sickle | B23B 29/03432 408/161 |
| 4,867,619 | A * | 9/1989 | Briggs | B23B 29/03457 408/158 |
| 4,941,782 | A * | 7/1990 | Cook | B23B 29/03457 408/147 |
| 5,010,955 | A | 4/1991 | Springer | |
| 5,012,863 | A | 5/1991 | Springer | |
| 5,427,480 | A * | 6/1995 | Stephens | B23B 29/03457 408/156 |
| 5,857,813 | A * | 1/1999 | Kress | B23B 29/03446 408/1 R |
| 6,238,150 | B1 * | 5/2001 | Yamada | B23B 51/02 407/9 |
| 6,312,200 | B1 * | 11/2001 | Graham | B23B 29/03446 408/1 R |
| 6,585,564 | B1 | 7/2003 | Hiramoto et al. | |
| 7,217,070 | B2 | 5/2007 | Hecht | |
| 7,607,209 | B2 | 10/2009 | Iizumi et al. | |
| 9,382,868 | B2 | 7/2016 | Stephenson et al. | |
| 2004/0194592 | A1 | 10/2004 | Feil et al. | |
| 2008/0245226 | A1 | 10/2008 | Iizumi et al. | |
| 2008/0245227 | A1 | 10/2008 | Iizumi et al. | |
| 2008/0260958 | A1 | 10/2008 | Sekikawa et al. | |
| 2010/0031799 | A1 | 2/2010 | Ast et al. | |
| 2010/0101526 | A1 | 4/2010 | Schaefer et al. | |
| 2010/0326270 | A1 | 12/2010 | Doerfler et al. | |
| 2011/0030663 | A1 | 2/2011 | Verpoort et al. | |
| 2013/0047947 | A1 | 2/2013 | Whitbeck et al. | |
| 2013/0199490 | A1 | 8/2013 | Schramm et al. | |
| 2013/0291823 | A1 | 11/2013 | Whitbeck et al. | |
| 2014/0010977 | A1 | 1/2014 | Whitbeck et al. | |
| 2014/0050544 | A1 | 2/2014 | Nedzlek et al. | |
| 2014/0216388 | A1 | 8/2014 | Strandburg, III et al. | |
| 2014/0227046 | A1 | 8/2014 | Ast et al. | |
| 2014/0360355 | A1 | 12/2014 | Whitbeck et al. | |
| 2014/0364042 | A1 | 12/2014 | Whitbeck et al. | |
| 2015/0082850 | A1 | 3/2015 | Flores et al. | |
| 2015/0292432 | A1 | 10/2015 | Stephenson et al. | |
| 2015/0352683 | A1 | 12/2015 | McDowell et al. | |
| 2016/0208370 | A1 | 6/2016 | Bauer et al. | |
| 2016/0193626 | A1 | 7/2016 | Wagener et al. | |
| 2020/0230839 | A1 * | 7/2020 | Stephenson | C23C 2/40 |

FOREIGN PATENT DOCUMENTS

| | | | |
|---|---|---|---|
| CN | 201338219 Y | 11/2009 | |
| CN | 202388017 U | 8/2012 | |
| CN | 103056402 A | 4/2013 | |
| DE | 4022579 A1 * | 1/1991 | ....... B23B 29/03457 |
| DE | 4402503 A1 * | 8/1995 | ....... B23B 29/03417 |
| FR | 2973267 B1 | 10/2012 | |
| GB | 979803 B1 | 1/1965 | |
| JP | 11010414 A * | 1/1999 | |
| JP | 2007283469 A * | 11/2007 | |
| JP | 2008137117 A | 6/2008 | |
| JP | 2009095918 A | 5/2009 | |

OTHER PUBLICATIONS

International Search Report for PCT/US2017/018651 dated May 11, 2017, 2 pages.
English Translation of Office Action dated Apr. 23, 2020 for Chinese Appn. No. 2017800869593, 3 pgs.
Chinese Office Action dated Sep. 14, 2020 for Chinese Appn. No. 2017800870181, 5 pgs.

* cited by examiner

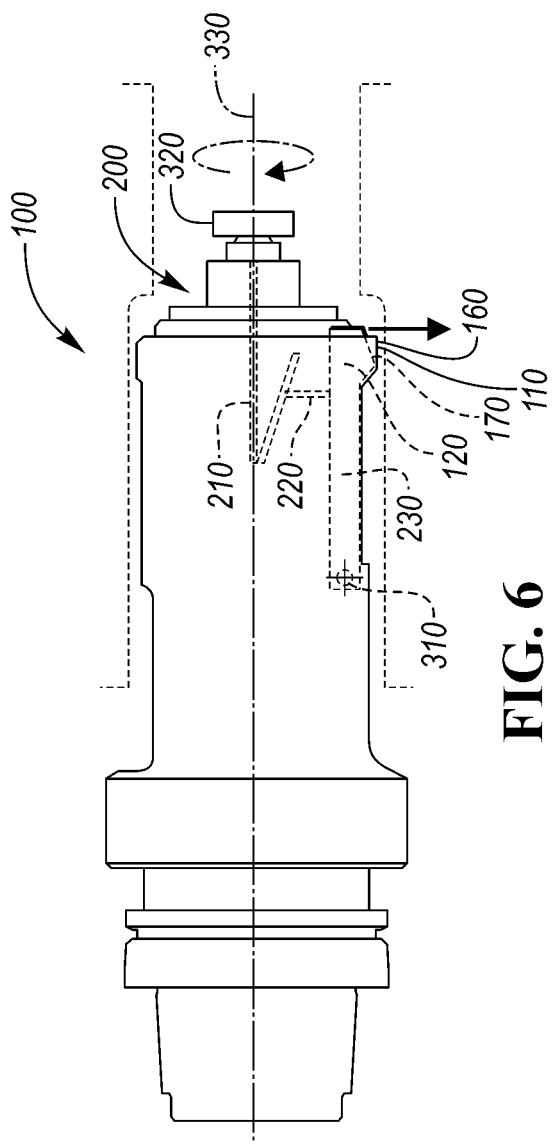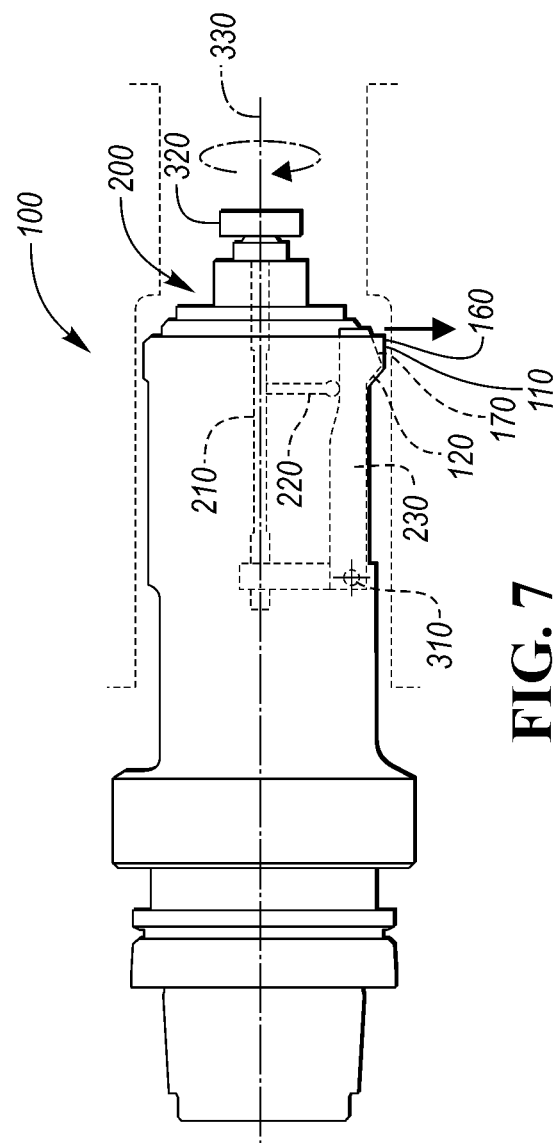

SURFACE ROUGHENING TOOL WITH TRANSLATABLE SWAGING BLADES

TECHNICAL FIELD

The present disclosure relates to tools for selective surface roughening of cylinder bores.

BACKGROUND

Cylinder bores of aluminum engine blocks, where an engine piston travels, may be treated with a thin layer of thermally sprayed steel for wear resistance. The cylinder bore surface is often machined, by mechanical roughening, to provide surface roughness to facilitate bonding of the steel coating. A grooving tool may be used to roughen a surface by cutting a series of grooves into the substrate. A rotary swage-wiper (swaging) tool then can deform the groove tops to produce an undercut. The use of the grooving and swiper/swager tools results in positional and orientation errors due to the intermediate tool change, a heavier nominal deformation, tool run out, and/or swiping depth variation resulting in voids and unevenness in the thermal spray coating.

SUMMARY

According to an embodiment, a surface roughening tool is disclosed. The surface roughening tool includes a cylindrical body and at least one grooving blade outwardly radially projecting from the body and configured to form grooves and peaks into a surface. The surface roughening tool further includes at least one swaging blade outwardly radially projecting from the body and configured to deform the peaks. The at least one swaging blade is aligned with the at least one grooving blade along a circumference of the body.

In one or more embodiments, the at least one swaging blade may be translatable between a retracted position and an extended position. The surface roughening tool may further include an actuator configured to translate the at least one swaging blade from the retracted position to the extended position. Each of the at least one grooving and swaging blades may include a distal end. When the at least one swaging blade is in the extended position, the distal end of each of the at least one swaging blades may extend beyond the distal end of each of the at least one grooving blades in a radial direction of the cylindrical body.

In one or more embodiments, the at least one grooving blade may be translatable between a retracted position and an extended position. The surface roughening tool may further include an actuator configured to translate the at least one grooving blade from an extended position to a retracted position. Each of the at least one grooving and swaging blades may include a distal end. When the at least one grooving blade is in the extended position, the distal end of each of the at least one grooving blades may extend beyond the distal end of each of the at least one swaging blades in a radial direction of the cylindrical body.

In one or more embodiments, the at least one grooving blades may include one or more grooving blades, and the at least one swaging blades may include one or more swaging blades. Each of the one or more swaging blades may be situated adjacent to and may correspond with one or more grooving blades to form a number grooving/swaging blade sets distributed around the circumference and height of the cylindrical body to form rows.

According to an embodiment, a surface roughening tool is disclosed. The surface roughening tool includes a cylindrical body and grooving blades outwardly radially projecting from the body. The grooving blades may be configured to form grooves and peaks into a surface. The surface roughening tool further includes swaging blades outwardly radially projecting from the body. The swaging blades are aligned with the grooving blades along a circumference of the body, and are configured to deform the peaks. One of the swaging blades is positioned adjacent to one of the grooving blades.

In one or more embodiments, each swaging blade may be translatable from a retracted position to an extended position. The cylindrical body may define recesses. Each recess may store at least a portion of one of the swaging blades. An actuator on the body may be configured to translate each swaging blade from the retracted position to the extended position. The body may house at least one elongated member. Each of the at least one elongated member may be connected to one of the swaging blades and may be configured to translate the corresponding swaging blade between the retracted position and the extended position. The cylindrical body may be rotatable about its longitudinal axis.

According to an embodiment, a surface roughening tool is disclosed. The surface roughening tool includes a cylindrical body, and one or more axial rows of grooving elements outwardly radially projecting from the body. Each row of grooving elements is situated along a circumference of the body. The surface roughening tool also includes one or more axial rows of swaging elements outwardly radially projecting from the body. Each row of swaging elements is situated along the circumference corresponding to each row of the one or more axial rows of grooving elements. Each swaging element has a retracted and extended position.

In one or more embodiments, the surface roughening tool may further include an actuator configured to translate each swaging element from the retracted position to the extended position. Each of the swaging elements and grooving elements may include a distal end. When each swaging element is in the extended position, the distal end of each of the swaging elements may extend beyond the distal end of each of the grooving elements in a radial direction of the cylindrical body. The swaging elements of each axial row of swaging elements may be interspersed between the grooving elements of one axial row of grooving elements. The grooving elements may be configured to form grooves and peaks into a surface when the swaging elements are in the retracted position. The swaging elements may be configured to deform the peaks when the swaging elements are in the extended position.

BRIEF DESCRIPTION OF THE DRAWINGS

FIG. 6 is a side view of the surface roughening tool according to one or more embodiments.

FIG. 7 is a side view of the surface roughening tool according to one or more embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Automotive engine blocks include a number of cylindrical engine bores. Cylinder bores may be formed and defined by a cylindrical wall of metal material, including steel iron, and aluminum. In certain instances, cylinder bores formed from and defined by relatively light weight metals, such as aluminum or magnesium, may be used instead of steel or iron cylinder bores to reduce engine size and/or weight and improve engine power output and fuel economy. When aluminum is used to construct such blocks, certain processes are known to enhance strength and wear resistance of the aluminum engine cylinder bores.

The inner surface of each engine bore is machined so that the surface is suitable for use in automotive applications, e.g., exhibits suitable wear resistance and strength. Internal cylindrical surfaces where an engine piston travels may be treated to provide surface roughness to facilitate bonding to a later applied metallic coating. The machining process may include roughening the inner surface, subsequently applying the metallic coating to the roughened surface, and honing the metallic coating to obtain a finished inner surface with the requisite strength and wear resistance. A metallic coating may be applied using thermal spraying. Alternatively, a liner material having requisite strength and wear resistance characteristics may be applied to the unfinished inner surface of the engine bore.

Figure 1:
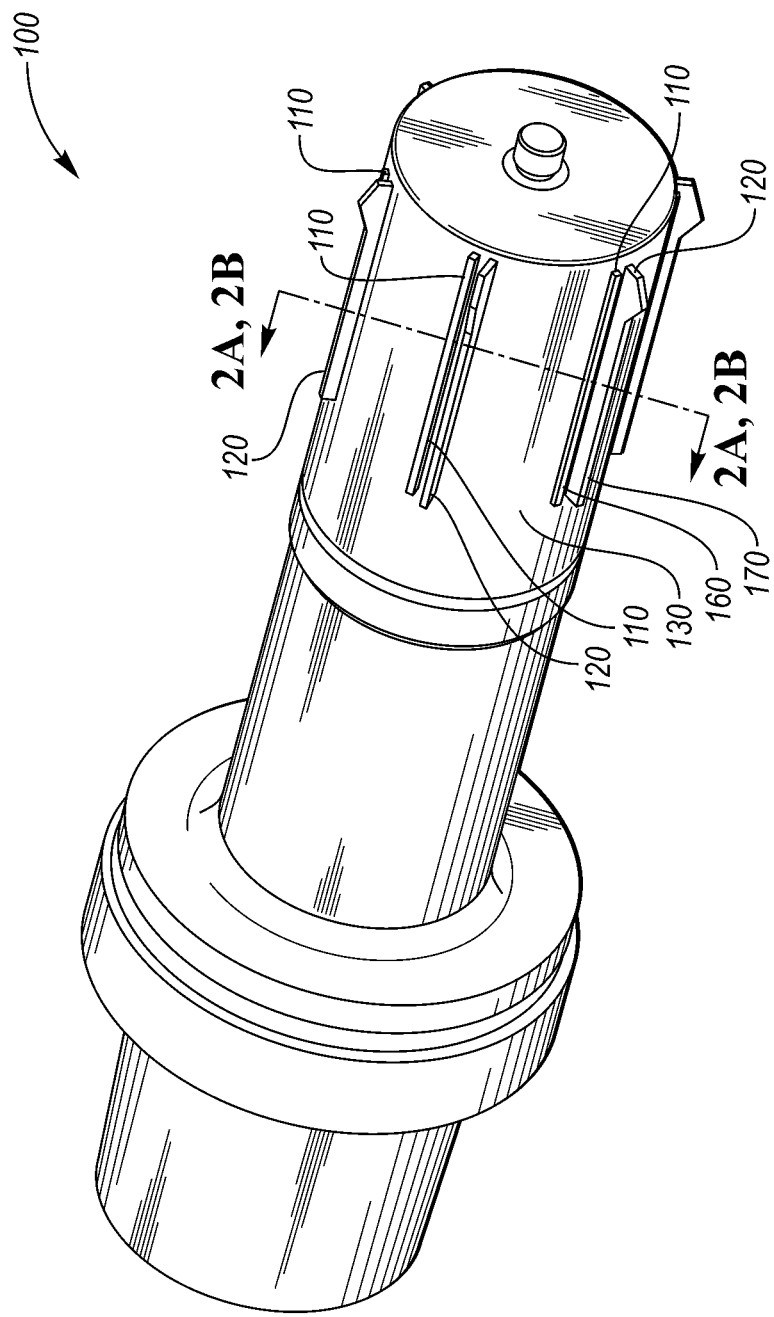
FIG. 1 depicts a perspective view of the surface roughening tool showing the grooving blades and swaging blades with the swaging blades extended.

FIG. 1 depicts a surface roughening tool 100 for roughening the surface of a cylinder bore to improve bonding of a thermally sprayed coating. Generally, the tool 100 is held in a holder fastened to a tool spindle (not shown). The spindle may be either a box or motorized spindle. The tool 100 is used to produce grooves into the surface of the cylinder bore, which run in the circumferential direction of the cylinder bore, as the tool 100 is lowered into the cylinder bore. The profile produced on the surface has grooves with intermediate ridges, or peaks, in between. The tool spindle has an axis of rotation parallel to the cylinder bore axis. The longitudinal axis of the tool (along the length) is offset from the cylinder bore axis. The tool rotates in the spindle about the tool axis at an angular speed, and precesses around the bore axis at a separate angular speed. The precession around the axis is referred to as circular interpolation. The tool 100 interpolates such that the tool blades rotate and move simultaneously in a circular path around the cylinder bore surface, moving down the length of the cylinder bore. This permits machining of grooves in any bore with a diameter larger than the tool 100 such that bores of different diameters can be cut with the same tool. The interpolation movement permits the formation of a pocket and the annular parallel grooves within the inner surface of the cylinder bore. The interpolation of the tool is discussed in U.S. patent application Ser. No. 13/913,865, filed on Jun. 10, 2013, and Ser. No. 13/461,160, filed on May 1, 2012, which are incorporated by reference herein in their entirety.

The grooving blades 110, or grooving elements, are projecting radially outward from the tool 100 on tool body 130, and are configured to cut into the surface to form the grooves and peaks. Cylindrical tool body 130 may be formed of steel or cemented tungsten carbide. The grooving elements 110 may be dispersed in one or more axial rows along the length of the tool 100 to provide a cutting edge. Grooving blades 110 have a distal end 160 and may be dispersed around the circumference of the tool body 130 and along the longitudinal axis of the tool 100 to form a desired profile of grooves and peaks within the cylinder bore. In a non-limiting example, grooving blades 110 are equally radially spaced apart from adjacent grooving blades 110. Any number of grooving blades 110 may be used. The grooving blades 110 may be formed of rows of grooving elements brazed end to end to form a long cutting edge. The grooving blades 110 may be formed of a cutting material suitable for machining aluminum or magnesium alloy. The considerations for selecting such materials include without limitation chemical compatibility and/or hardness. Non-limiting examples of such materials include, without limitation, high speed steel, sintered tungsten carbide or polycrystalline diamond. The grooving blades and elements may also include pocket cutting elements.

The surface roughening tool 100 also includes swaging blades 120, or swaging elements, which deform the peaks formed by the grooving blades 110 to produce an undercut on the peaks. The swaging elements may also be referred to as swiping elements because the tool used for deformation may be a swiper (swage/wiper). The resulting profile may be a dovetail type shape of the peaks. The swaging blades are dispersed corresponding to the grooving blades 110 such that the swaging blades 120 can deform the peaks formed by the grooving blades 110. The swaging elements 110 may be dispersed in one or more axial rows along the length of the tool 100 to provide a cutting edge. The swaging blades 120 may be formed of swaging elements brazed end to end to form a long cutting edge. The swaging blades may be dispersed around the circumference of the tool body 130 as well as along the longitudinal axis of the tool 100 to form the desired profile of grooves and undercut peaks within the cylinder bore. The swaging blades 120 are capable of projecting radially outward from the tool 100, beyond the grooving blades 110, and may also be storable in a recess of the tool body 130. The swaging blades 110 may be formed of a cutting material suitable for machining aluminum or magnesium alloy. The considerations for selecting such materials include without limitation chemical compatibility and/or hardness. A non-limiting example of the swaging blades 120 includes polycrystalline diamond.

Figure 2A:
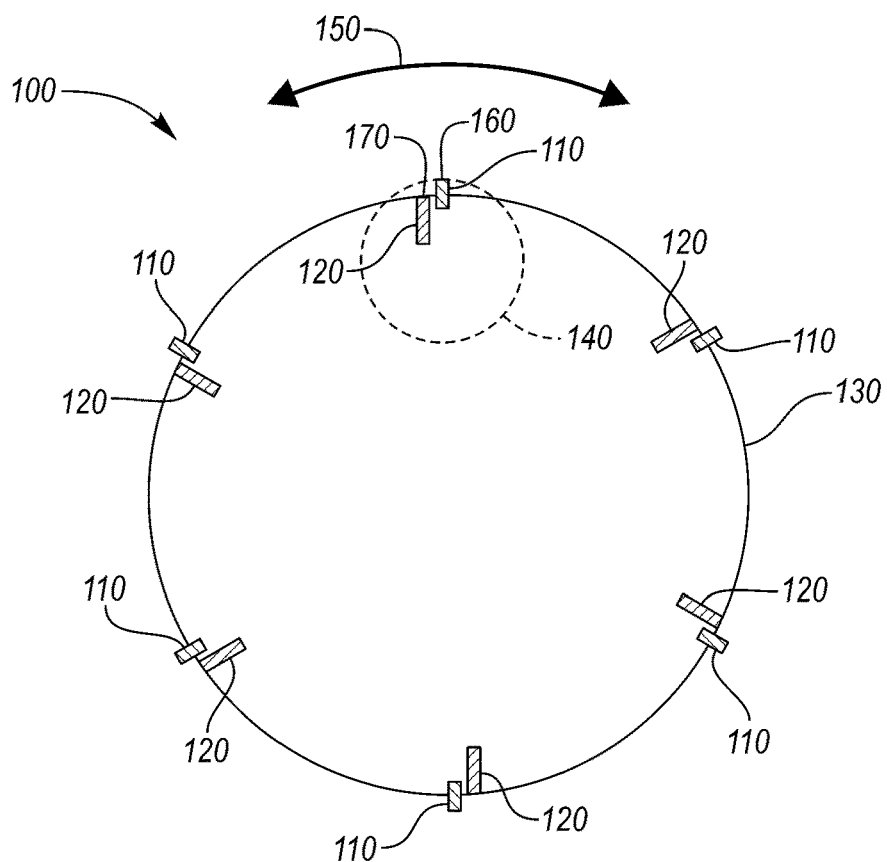
FIG. 2A depicts a partial cross-section of the swaging blades and grooving blades of FIG. 1 taken along line 2A, 2B with the swaging blades retracted.
Figure 2B:
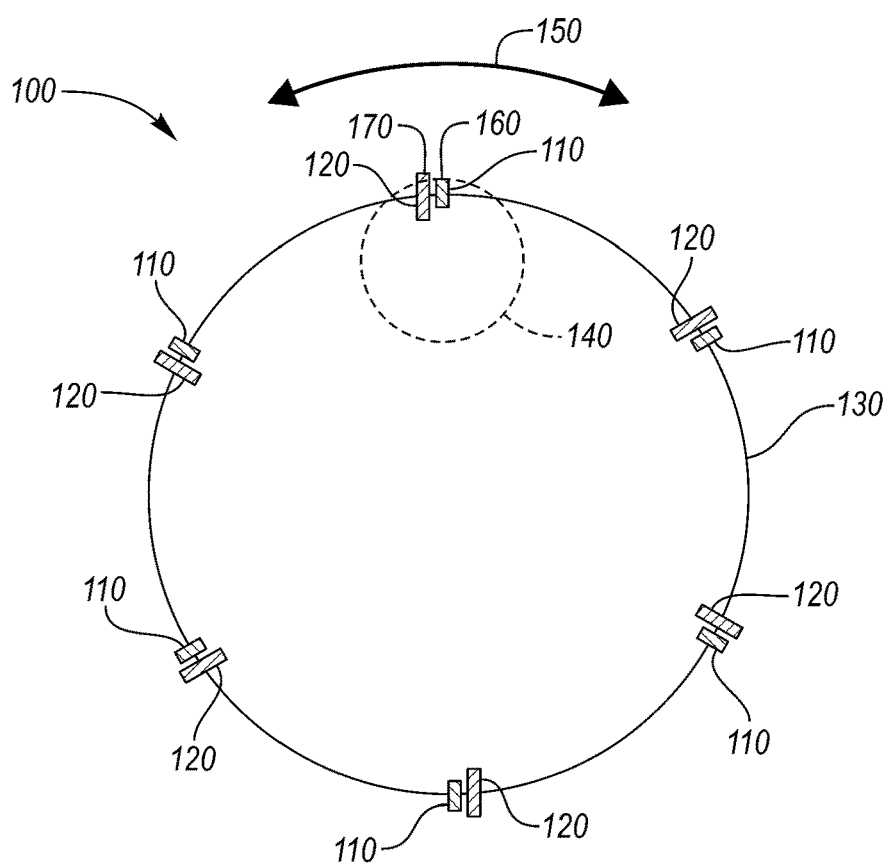
FIG. 2B depicts a partial cross-section of the swaging blades and grooving blades of FIG. 1 taken along line 2A, 2B with the swaging blades extended.

FIGS. 2A and 2B show a cross section of the tool taken along line 2A, 2B. Swaging blades 120 are translatable between a retracted position and an extended position, as shown in FIGS. 2A and 2B, respectively. When the swaging blades 120 are in the retracted position, the blades 120 are wholly or partially stored in a recess in the tool body 130 such that the cutting edge of the swaging blades 120 are not in contact with the cylinder bore surface. Distal end 160 of each grooving blade 110 cutting edge extends beyond the distal end 170 of the swaging blade 120 such that the grooving blade 110 can cut the grooves and peaks into the cylinder bore when the swaging blade 120 is in the retracted position. After the grooves and peaks have been cut, the swaging blades 120 translate to the extended position during rotation 150 such that distal end 170 of the swaging blade 120 extends radially outwardly beyond the distal end 160 of grooving blade 110. The distal end 160 of the grooving blade 110 sets a circumference 140 such that the distal end 170 of the swaging blade 120 extends beyond this circumference 140 when in the extended position.

Although FIGS. 2A and 2B show that the swaging blades 120 are translatable between a retracted position and an extended position, in certain other instances the grooving elements 110 may be translatable, or both sets of blades may be translatable, to roughen the surface by producing grooves and peaks, and deforming the peaks thereafter. Similarly, the orientation of the grooving blades 110 and swaging blades 120 with respect to the tool rotation 150 may be reversed, as well as the tool rotation itself.

Figure 3A:
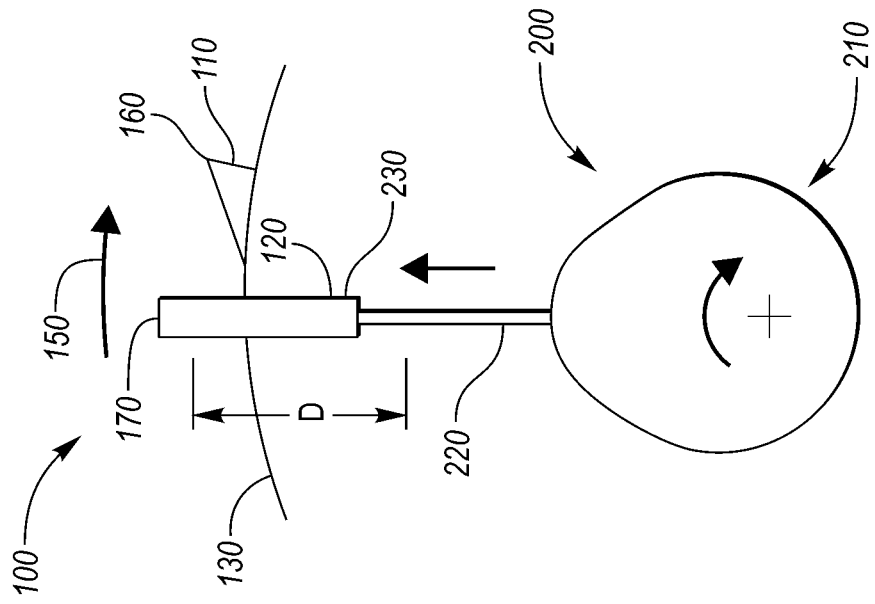
FIG. 3A depicts a partial and isolated schematic view of the surface roughening tool with the swaging blade retracted.
Figure 3B:
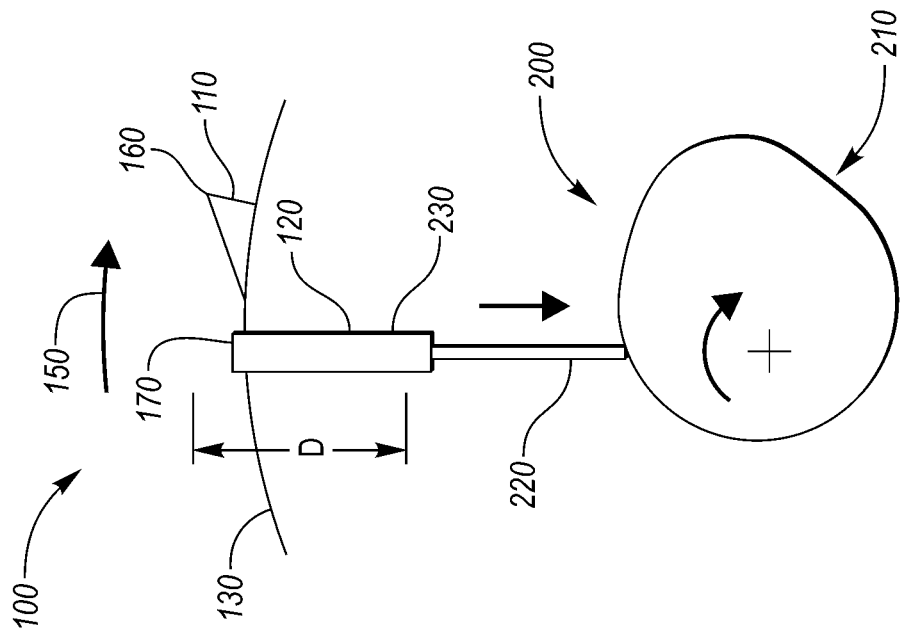
FIG. 3B depicts a partial and isolated schematic view of the surface roughening tool of with the swaging blade extended.

FIGS. 3A and 3B depict an enlarged partial view of the surface roughening tool 100. Distance D shows the distance swaging blade 120 translates for the distal end 170 of the swaging blade 120 to extend past the distal end 160 of the grooving blade 110. Swaging blade 120 is translated by an actuator 200. The actuator 200 may utilize an eccentric cam, cone and wedge, screw mechanism, or any similar mechanism. The actuator 200 in some instances includes an elongated member 220 connected to a cam 210 for translating the swaging blade 120. The elongated member 220 is connected to a cartridge 230 which stores the swaging blade 120 in the recess of the tool body. As the tool 100 rotates through a fixed angle in direction 150, cam 210 moves the elongated member 220 to push the cartridge 230 to translate the swaging blade 120 out of the tool body 130 to the extended position.

Figure 4A:
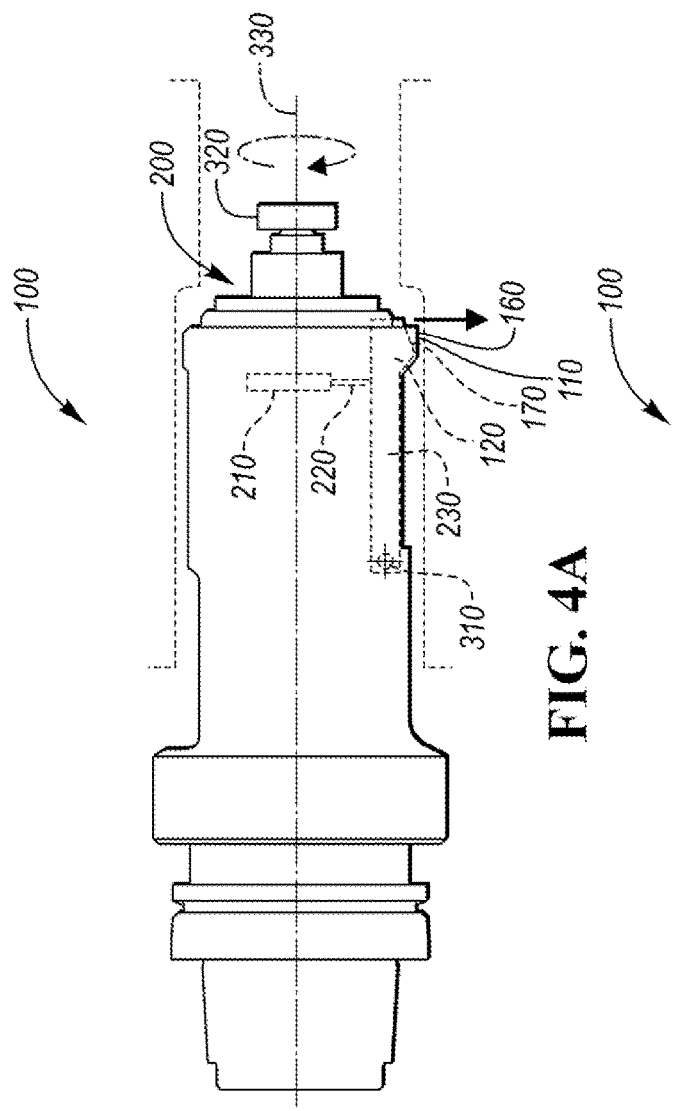
FIG. 4A is a side view of the surface roughening tool depicting one swaging blade retracted according to one or more embodiments.
Figure 4B:
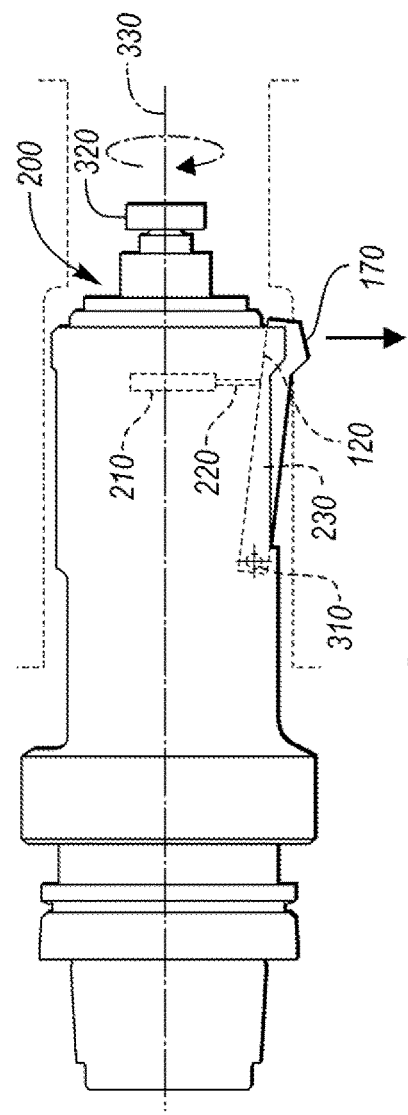
FIG. 4B is a top view of the surface roughening tool depicting one swaging blade retracted according to one or more embodiments.
Figure 5A:
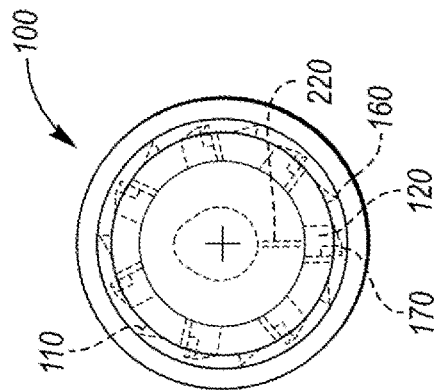
FIG. 5A is a side view of the surface roughening tool depicting one swaging blade extended according to one or more embodiments.
Figure 5B:
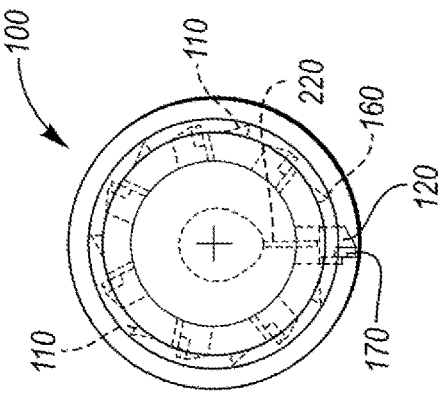
FIG. 5B is a top view of the surface roughening tool depicting one swaging blade extended according to one or more embodiments.
Figure 8:
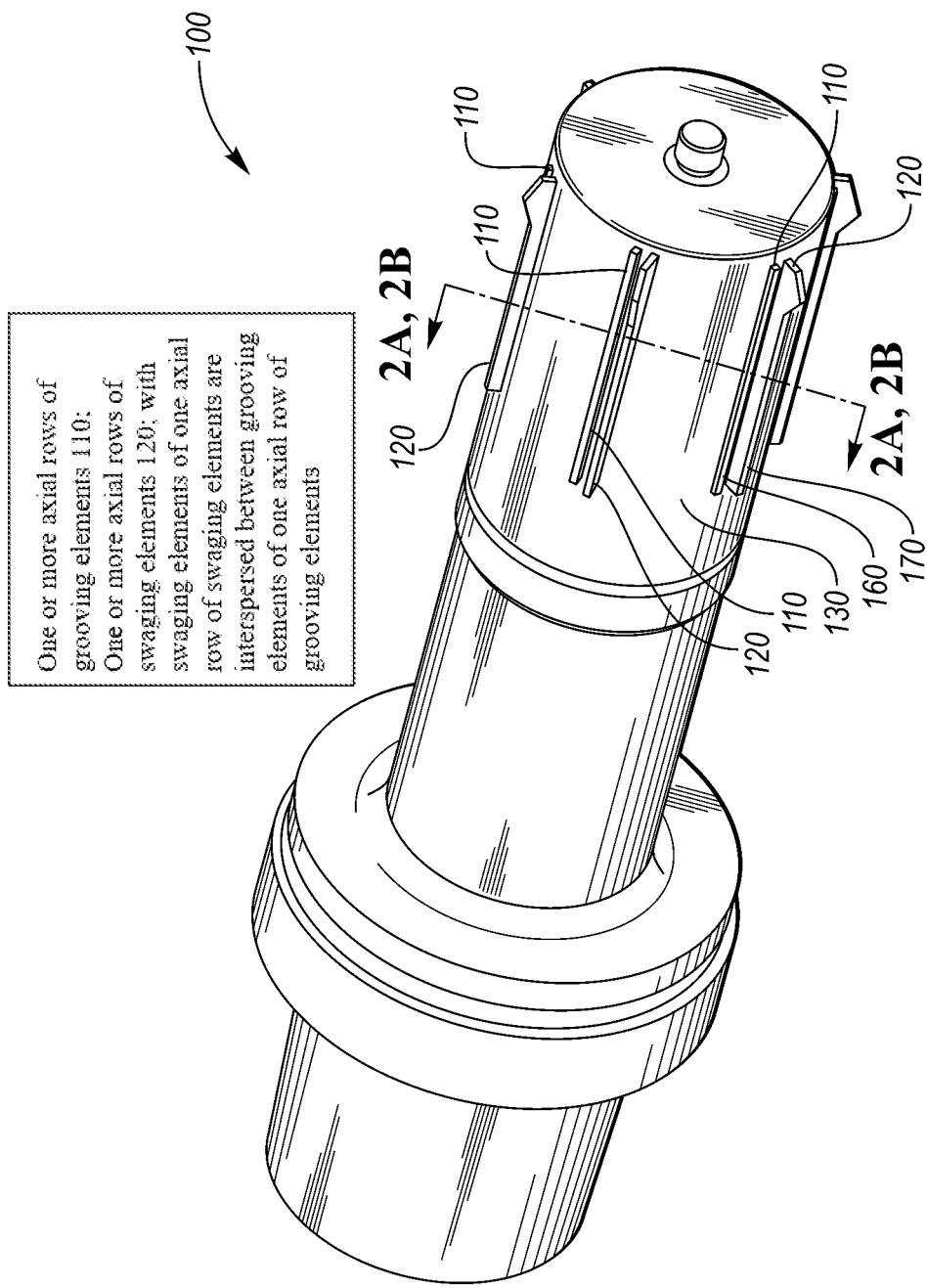
FIG. 8 depicts a perspective view of a surface roughening tool, according to other embodiments.

FIGS. 4A-B, 5A-B, and 6-7 show schematics of tool 100 utilizing various actuators 200, such as a cam, screw, or cone and wedge. As shown in FIGS. 4A-B, 5-AB, and 6-7, one actuator mechanism is shown for translating one swaging blade for illustrative purposes. In one embodiment, all axially dispersed swaging blades can be translated similarly. For example, six axially located swaging blades may be similarly translated simultaneously by a mechanism for each swaging blade. FIG. 4A-B shows cam 210 connected to elongated member 220 for pushing an end of cartridge 230, which has a pivot 310, for translating one swaging blade 120 to the extended position. The actuator 200 may be activated by a knob 320 on the tool 100 being rotated in a direction around axis 330. FIGS. 5A-B show one swaging blade 120 in the extended position, after the cam 210 engages the elongated member 220 to push the cartridge 230 about pivot 310. FIG. 5B shows the top view after one swaging blade 120 is extended such that the base pivot 310, where the swaging blade 120 was previously aligned, is stationary. FIG. 6 depicts a cam mechanism 210 for actuator 200. FIG. 7 depicts a wedge mechanism 210 for actuator 200.

Having described the structure of tool 100 according to one or more embodiments, the following describes the method of using an embodiment of the tool 100 to machine a profile into an inner surface of a cylinder bore. The tool 100 is typically mounted in a machine tool spindle with an axis of rotation parallel to the cylinder bore axis, offset from the bore axis. The tool is positioned within the cylindrical bore, with fixed grooving blades and translatable swaging blades. The tool interpolates around the cylinder bore at different angular speeds about the tool axis and the bore axis. The interpolating movement permits the formation of a pocket and annular, parallel grooves within the inner surface of a cylinder bore while the swaging blades are in the retracted position. After forming the annular profile of grooves and peaks in the cylinder bore surface, the swaging blades 120 are translated to the extended position such that swaging blades 120 interpolate over the same tool path as the grooving blades 110 to reduce positional and orientation errors. The tool 100 is maintained at an axial location along the length of the cylinder bore during the forming and deforming steps. An actuator 200 is engaged to translate the swaging blades between the retracted and extended positions. The swaging blades 120 deform the peaks after they are translated to the extended position. In the extended position, the swaging blades 120 have distal ends for deforming, which extend radially beyond the distal ends of the grooving blades 110, and produce an undercut on the peaks. Further, after deforming the peaks, the swaging blades 120 are translated back to the retracted position. The tool 100 may then be returned to a tool magazine. The tool 100 may be removed from the cylinder bore for extending and retracting the swaging blades 120.

In one or more embodiments, one of the grooving elements 110 and swaging elements 120 are translatable. For example, the grooving blades 110 may be retractable, and the swaging blades 120 fixed, such that the grooving blades are translated to the retracted position after producing the grooves and peaks in the surface. The retracted position of the grooving blades 120 is radially inward of the swaging blades 120 so that the swaging blades can deform the peaks thereafter. Similarly, in other embodiments, both the grooving blades and the swaging blades may be translatable between an extended and retracted position to form the grooves and peaks, and deform the peaks thereafter.

The machined surface after the grooving step and the swaging step has one or more advantages over other roughening processes. First, adhesion strength of the metal spray may be improved by using the swaging step instead of other secondary processes, such as diamond knurling, roller burnishing, wire brushing, or hydraulic expansion. The adhesion strength was tested using a pull test. The adhesion strength may be in the range of 40 to 70 MPa. In other variations, the adhesion strength may be 50 to 60 MPa. Compared to the adhesion strength of a diamond knurling process, the adhesion strength of swiping is at least 20% higher. Further, the Applicants have recognized that adhesion is independent of profile depth of the grooves after the first processing step. This may be advantageous for at least two reasons. The swaging blades cut relatively lower profile depths compared to conventional processes, such as diamond knurling, roller burnishing, and brushing. In certain variations, the reduction in profile depth is 30 to 40%. Accordingly, less metal spray material is necessary to fill the profile while not compromising adhesion strength. Also, any variation in the depth of the grooves does not affect the adhesion strength, which makes the swaging step more robust than conventional processes. As another benefit of one or more embodiments, the swaging step can be operated at much higher operational speeds than other processes, such as roller burnishing or diamond knurling. In addition, translating the swaging blades to the extended position for the swaging step eliminates positional errors and run out due to tool change between the grooving and swaging steps of roughening the cylinder bore surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A surface roughening tool comprising:
    a cylindrical body;
    one or more axial rows of grooving elements outwardly radially projecting from the body, each row situated along a circumference of the body, with each of the grooving elements having a retracted position and an extended position; and
    one or more axial rows of swaging elements outwardly radially projecting from the body, each row situated along the circumference corresponding to each row of the one or more axial rows of grooving elements, each of the swaging elements having a corresponding fixed distal end forming a fixed swaging circumference concentric with the circumference of the body,
    wherein in the extended position, each grooving element has a distal end positioned radially outward of the fixed distal ends of the swaging elements to form an extended grooving circumference radially outward of the fixed swaging circumference, and in the retracted position, the distal end of each grooving element is positioned radially inward of the fixed distal ends of the swaging elements.

2. The tool of claim 1, further comprising an actuator configured to translate each grooving element from the retracted position to the extended position.

3. The tool of claim 1, wherein in the retracted position, the distal end of each grooving element is positioned radially inward of the circumference of the cylindrical body to be housed in the cylindrical body.

4. The tool of claim 1, wherein swaging elements of one axial row of swaging elements are interspersed between grooving elements of one axial row of grooving elements.

5. The tool of claim 1, wherein the grooving elements are configured to form grooves and peaks into a surface when the grooving elements are in the extended position.

6. The tool of claim 5, wherein the swaging elements are configured to deform the peaks when the grooving elements are in the retracted position.

* * * * *